(12) United States Patent
Lu et al.

(10) Patent No.: US 9,914,286 B2
(45) Date of Patent: Mar. 13, 2018

(54) POLYMER INTERLAYERS HAVING IMPROVED OPTICAL PROPERTIES

(71) Applicant: Solutia Inc., St. Louis, MO (US)

(72) Inventors: Jun Lu, East Longmeadow, MA (US); Wenjie Chen, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 15/438,243

(22) Filed: Feb. 21, 2017

(65) Prior Publication Data

US 2017/0157905 A1    Jun. 8, 2017

Related U.S. Application Data

(63) Continuation of application No. 14/973,500, filed on Dec. 17, 2015, now Pat. No. 9,592,653, which is a continuation of application No. 14/299,996, filed on Jun. 9, 2014, now Pat. No. 9,254,625.

(60) Provisional application No. 61/833,205, filed on Jun. 10, 2013.

(51) Int. Cl.

| | |
|---|---|
| *B32B 27/22* | (2006.01) |
| *B32B 27/30* | (2006.01) |
| *B32B 7/02* | (2006.01) |
| *B32B 27/08* | (2006.01) |
| *C08L 29/14* | (2006.01) |
| *C08K 5/00* | (2006.01) |
| *C08L 29/04* | (2006.01) |
| *C08K 5/11* | (2006.01) |
| *C08K 5/12* | (2006.01) |
| *C08K 5/13* | (2006.01) |
| *B32B 17/10* | (2006.01) |
| *C08J 5/18* | (2006.01) |
| *B32B 27/42* | (2006.01) |
| *C08K 5/101* | (2006.01) |

(52) U.S. Cl.
CPC ........... *B32B 27/22* (2013.01); *B32B 7/02* (2013.01); *B32B 17/10036* (2013.01); *B32B 17/1055* (2013.01); *B32B 17/10605* (2013.01); *B32B 17/10761* (2013.01); *B32B 27/08* (2013.01); *B32B 27/30* (2013.01); *B32B 27/306* (2013.01); *B32B 27/42* (2013.01); *C08J 5/18* (2013.01); *C08K 5/0016* (2013.01); *C08K 5/101* (2013.01); *C08K 5/11* (2013.01); *C08K 5/12* (2013.01); *C08K 5/13* (2013.01); *C08L 29/04* (2013.01); *C08L 29/14* (2013.01); *B32B 2250/02* (2013.01); *B32B 2250/03* (2013.01); *B32B 2250/246* (2013.01); *B32B 2307/412* (2013.01); *B32B 2307/418* (2013.01); *B32B 2307/546* (2013.01); *B32B 2307/558* (2013.01); *B32B 2307/56* (2013.01); *B32B 2329/06* (2013.01); *B32B 2419/00* (2013.01); *B32B 2457/12* (2013.01); *B32B 2605/08* (2013.01); *B32B 2605/18* (2013.01); *C08J 2329/14* (2013.01); *C08L 2205/02* (2013.01); *C08L 2205/025* (2013.01); *Y10T 428/24983* (2015.01)

(58) Field of Classification Search
None
See application file for complete search history.

(56) References Cited

U.S. PATENT DOCUMENTS

| | | | |
|---|---|---|---|
| 2,282,026 | A | 5/1942 | Bren et al. |
| 2,282,057 | A | 5/1942 | Hopkins et al. |
| 2,456,366 | A | 12/1948 | Bren et al. |
| 3,644,594 | A | 2/1972 | Mont |
| 4,361,625 | A | 11/1982 | Beckmann et al. |
| 4,584,229 | A | 4/1986 | Bourelier et al. |
| 4,874,814 | A | 10/1989 | Cartier |
| 5,169,897 | A | 12/1992 | Walls |
| 5,190,826 | A | 3/1993 | Asahina et al. |
| 5,290,660 | A | 3/1994 | Eian et al. |
| 5,340,654 | A | 8/1994 | Ueda et al. |
| 5,409,734 | A | 4/1995 | Lee et al. |
| 5,593,786 | A | 1/1997 | Parker et al. |
| 5,728,472 | A | 3/1998 | D'Errico |
| 6,372,352 | B1 | 1/2002 | Bletsos et al. |
| 6,984,679 | B2 | 1/2006 | Papenfuhs et al. |
| 7,121,380 | B2 | 10/2006 | Garnier et al. |
| 7,452,608 | B2 | 11/2008 | Fukatani et al. |
| 7,510,771 | B2 | 3/2009 | Lu |
| 7,854,993 | B2 | 12/2010 | Lu |
| 7,883,761 | B2 | 2/2011 | Bourcier et al. |
| 8,470,908 | B2 | 6/2013 | Frank |
| 8,597,792 | B2 | 12/2013 | Meise et al. |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

ChemicalBook, Triethylene glycol bis(2-ethylhexanoate), Access Jul. 13, 2015 by Examiner, First Page.
Ellis, Bryan and Ray Smith. "Polymers—A Property Database ($2^{nd}$ Edition)", Dec. 2009, Taylor & Francis, $2^{nd}$ Edition, p. 573.
http://www.chemicalbook.com/ChemicalProductProperty_EN_CB0225180.htm; Jul. 2011.
Sigma-Aldrich®. "Poly(3-methyl-1,5-pentanediol Adipate)," Retrieved Apr. 11, 2016, p. 1.

(Continued)

*Primary Examiner* — Vu A Nguyen
(74) *Attorney, Agent, or Firm* — Michelle Bugbee

(57) ABSTRACT

An interlayer comprised of a thermoplastic resin, at least one high refractive index plasticizer and, optionally, a conventional plasticizer. The use of a thermoplastic resin, a high refractive index plasticizer, and, optionally, a conventional plasticizer reduces or minimizes the optical defects caused by different refractive indices without sacrificing other characteristics of the interlayer.

20 Claims, No Drawings

(56) References Cited

U.S. PATENT DOCUMENTS

| | | | |
|---|---|---|---|
| 8,715,815 | B2 | 5/2014 | Shimamoto |
| 8,741,439 | B2 | 6/2014 | Shimamoto et al. |
| 8,920,930 | B2 | 12/2014 | Meise et al. |
| 9,114,595 | B2 | 8/2015 | Bourcier et al. |
| 9,238,354 | B2 | 1/2016 | Iwamoto |
| 2003/0139520 | A1 | 7/2003 | Toyama |
| 2004/0065229 | A1 | 4/2004 | Papenfuhs et al. |
| 2004/0219365 | A1 | 11/2004 | Yuan |
| 2005/0142332 | A1 | 6/2005 | Sauer |
| 2006/0210776 | A1 | 9/2006 | Lu et al. |
| 2007/0036956 | A1 | 2/2007 | Chen et al. |
| 2007/0122629 | A1 | 5/2007 | Chen et al. |
| 2007/0148472 | A1 | 6/2007 | Masaki et al. |
| 2007/0248809 | A1 | 10/2007 | Haldeman et al. |
| 2007/0289693 | A1 | 12/2007 | Anderson et al. |
| 2008/0268270 | A1* | 10/2008 | Chen .................... C08L 29/14 |
| | | | 428/516 |
| 2008/0280076 | A1 | 11/2008 | Hayes et al. |
| 2008/0286542 | A1 | 11/2008 | Hayes et al. |
| 2008/0306190 | A1 | 12/2008 | Weiss |
| 2009/0226750 | A1 | 9/2009 | Lu |
| 2009/0293952 | A1 | 12/2009 | Koran et al. |
| 2010/0028642 | A1 | 2/2010 | Steuer et al. |
| 2010/0040868 | A1 | 2/2010 | Fukatani et al. |
| 2010/0124647 | A1 | 5/2010 | Keller et al. |
| 2012/0133764 | A1 | 5/2012 | Hurlbut |
| 2012/0263958 | A1 | 10/2012 | Iwamoto et al. |
| 2012/0288722 | A1 | 11/2012 | Iwamoto |
| 2013/0022824 | A1 | 1/2013 | Meise et al. |
| 2013/0022825 | A1 | 1/2013 | Meise et al. |
| 2013/0157065 | A1 | 6/2013 | Shimamoto et al. |
| 2013/0189527 | A1 | 7/2013 | Meise et al. |
| 2013/0236693 | A1 | 9/2013 | Lu |
| 2013/0236711 | A1 | 9/2013 | Lu |
| 2013/0274396 | A1 | 10/2013 | Arendt et al. |
| 2013/0323516 | A1 | 12/2013 | Shimamoto et al. |
| 2014/0000977 | A1 | 1/2014 | Matsuda et al. |
| 2015/0158276 | A1 | 6/2015 | Thompson et al. |
| 2015/0306853 | A1 | 10/2015 | Beekhuizen |
| 2016/0046783 | A1 | 2/2016 | Asanuma |
| 2016/0046784 | A1 | 2/2016 | Asanuma |

FOREIGN PATENT DOCUMENTS

| | | |
|---|---|---|
| JP | 05-104687 A | 4/1993 |
| JP | 05-310449 A | 11/1993 |
| JP | 09-156967 A | 6/1997 |
| WO | WO 2010/108975 A1 | 9/2010 |
| WO | WO 2012/092366 | 7/2012 |

OTHER PUBLICATIONS

Dupont, Untitled [discloses comparisons between PVB and SGP interlayers used in safety glass], accessed on Sep. 12, 2016, Dupont.com, obtained from http://www2.dupont.com/Building_Innovations/zh_CN/assets/downloads/SGPintro_E.pdf.

PubChem, Glutaraldehyde, accessed on Sep. 12, 2016, NIH.gov, obtained from https://pubchem.ncbi.nlm.nih.gov/compound/glotaraldehyde#section=Top.

Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.

AzoM, Indium Tin Oxide (ITO)—Properties and Applications, Jan. 23, 2004, Azo Materials, obtained from http://www.azom.com/article.aspx?ArticleID=2349.

Sigma-Aldrich "Di(propylene glycol) dibenzoate" retrieved Jul. 1, 2016, 3 pages.

Wade, B.E., Vinyl Acetal Polymers, in Encyclopedia of Polymer Science & Technology, 3rd edition, vol. 8, pp. 381-399, (2003).

"Aerosil MOX 170 MSDS"; Evonik Industries, Jun. 25, 2016; pp. 1-12.

Copending U.S. Appl. No. 14/299,945, filed Jun. 9, 2014, Jun Lu, et al.; now U. S. Publication No. 2014-0363651.

Office Action dated Jul. 8, 2015 received in co-pending U.S. Appl. No. 14/299,945.

Office Action dated Dec. 3, 2015 received in co-pending U.S. Appl. No. 14/299,945.

Office Action dated Oct. 4, 2016 received in co-pending U.S. Appl. No. 14/299,945.

Copending U.S. Appl. No. 14/300,612, filed Jun. 10, 2014, Jun Lu; now U.S. Pat. No. 9,248,626.

Copending U.S. Appl. No. 14/973,547, filed Dec. 17, 2015, Jun Lu.; now U. S. Publication No. 2016/0102181.

Office Action dated Feb. 1, 2017 received in co-pending U.S. Appl. No. 14/973,547.

Notice of Allowance and Fee(s) due dated Mar. 21, 2017 received in co-pending U.S. Appl. No. 14/973,547.

Copending U.S. Appl. No. 15/474,105, filed Mar. 30, 2017, Jun Lu.

Copending U.S. Appl. No. 14/299,975, filed Jun. 9, 2014, Jun Lu, et al.; now U. S. Publication Number 2014-0363652.

Office Action dated Jul. 6, 2015 received in co-pending U.S. Appl. No. 14/299,975.

Office Action dated Nov. 30, 2015 received in co-pending U.S. Appl. No. 14/299,975.

Co-pending U.S. Appl. No. 14/563,347, filed Dec. 8, 2014; Jun Lu and Yalda Farhoudi; now U.S. Pat. No. 9,586,386.

Co-pending U.S. Appl. No. 15/428,557, filed Feb. 9, 2017, Jun Lu and Yalda Farhoudi.

Copending U.S. Appl. No. 14/563,352, filed Dec. 8, 2014, Zhou Li, et al.; now U. S. Publication No. 2016-0160026.

Copending U.S. Appl. No. 14/563,359, filed Dec. 8, 2014, Jun Lu, et al.; now U. S. Publication No. 2016-0160033.

Copending U.S. Appl. No. 14/563,364, filed Dec. 8, 2014, Jun Lu, et al.; now U.S. Pat. No. 9,522,517.

Co-pending U.S. Appl. No. 15/376,849, filed Dec. 13, 2016; Lu and Li; now U. S. Patent Publication No. 2017-0087813.

Copending U.S. Appl. No. 14/563,372, filed Dec. 8, 2014, Jun Lu, et al.; now U.S. Pat. No. 9,586,387.

Co-pending U.S. Appl. No. 15/427,798, filed Feb. 8, 2017.

Copending U.S. Appl. No. 14/563,373, filed Dec. 8, 2014, Jun Lu, et al.; now U.S. Pat. No. 9,573,329.

Copending U.S. Appl. No. 15/246,810, filed Aug. 25, 2016; Jun Lu et al.; now U. S. Patent Publication No. 2016-0361899.

Co-pending U.S. Appl. No. 15/427,844, filed Feb. 8, 2017; Lu and Li.

Copending U.S. Appl. No. 14/514,641, filed Oct. 15, 2014, Jun Lu; now U.S. Pat. No. 9,355,631.

Copending U.S. Appl. No. 14/882,317, filed Oct. 13, 2015, Jun Lu, et al.; now U. S. Publication No. 2016-0107424.

Office Action dated Mar. 9, 2017 received in co-pending U.S. Appl. No. 14/882,317.

Copending U.S. Appl. No. 15/051,222, filed Feb. 23, 2016, Jun Lu; now U.S. Pat. No. 9,460,702.

Copending U.S. Appl. No. 15/248,502, filed Aug. 26, 2016; Jun Lu; now U.S. Pat. No. 9,576,568.

Copending U.S. Appl. No. 14/505,191, filed Oct. 2, 2014, Jun Lu; now U. S. Publication No. 2016-0096349.

Office Action dated Jul. 27, 2015 received in co-pending U.S. Appl. No. 14/505,191.

Office Action dated Apr. 21, 2016 received in co-pending U.S. Appl. No. 14/505,191.

Office Action dated Nov. 21, 2016 received in co-pending U.S. Appl. No. 14/505,191.

Copending U.S. Appl. No. 14/505,247, filed Oct. 2, 2014, Jun Lu; now U. S. Publication No. 2016-0096350.

Office Action dated Jul. 27, 2015 received in co-pending U.S. Appl. No. 14/505,247.

Office Action dated Dec. 31, 2015 received in co-pending U.S. Appl. No. 14/505,247.

Office Action dated Apr. 22, 2016 received in co-pending U.S. Appl. No. 14/505,247.

Office Action dated Nov. 25, 2016 received in co-pending U.S. Appl. No. 14/505,247.

(56) References Cited

OTHER PUBLICATIONS

Copending U.S. Appl. No. 14/563,378, filed Dec. 8, 2014, Jun Lu, et al.; now U. S. Publication No. 2016-0160029.
Office Action dated Oct. 6, 2016 received in co-pending U.S. Appl. No. 14/563,378.
Copending U.S. Appl. No. 14/563,622, filed Dec. 8, 2014, Jun Lu, et al.; now U. S. Publication No. 2016-0159050.
Office Action dated Mar. 9, 2017 received in co-pending U.S. Appl. No. 14/563,622.
Copending U.S. Appl. No. 14/563,719, filed Dec. 8, 2014, Jun Lu, et al.; now U. S. Publication No. 2016-0159039.
Office Action dated Mar. 9, 2017 received in co-pending U.S. Appl. No. 14/563,719.
Copending U.S. Appl. No. 14/563,011, filed Dec. 8, 2014, Jun Lu; now U. S. Publication No. 2016-0159041.
Office Action dated Sep. 16, 2016 received in co-pending U.S. Appl. No. 14/563,011.
Copending U.S. Appl. No. 14/563,381, filed Dec. 8, 2014, Jun Lu, et al.; now U. S. Publication No. 2016-0160034.
Copending U.S. Appl. No. 15/051,183, filed Feb. 23, 2016, Spangler et al.; now U. S. Publication No. 2016-0168353.
PCT International Search Report and Written Opinion dated Jan. 22, 2015 for International Application No. PCT/US2014/041689.
PCT International Search Report and Written Opinion dated Aug. 29, 2014 for International Application No. PCT/US2014/041698.
PCT International Search Report and Written Opinion dated Jan. 26, 2016 for International Application No. PCT/US2015/063907.
PCT International Search Report and Written Opinion dated May 23, 2016 for International Application No. PCT/US2015/063908.
PCT International Search Report and Written Opinion dated Jan. 26, 2016 for International Application No. PCT/US2015/063885.
PCT International Search Report and Written Opinion dated Jan. 7, 2016 for International Application No. PCT/US2015/055633.
PCT International Search Report and Written Opinion dated Nov. 19, 2015 for International Application No. PCT/US2015/051591.
PCT International Search Report and Written Opinion dated Nov. 19, 2015 for International Application No. PCT/US2015/051593.
PCT International Search Report and Written Opinion dated Apr. 18, 2016 for International Application No. PCT/US2015/063933.
PCT International Search Report and Written Opinion dated Mar. 29, 2016 for International Application No. PCT/US2015/063944.
PCT International Search Report and Written Opinion dated Jan. 26, 2016 for International Application No. PCT/US2015/063975.
Notification of Transmittal of the International Search Report and the Written Opinion of the International Searching Authority, or the Declaration dated Jul. 1, 2016 received in International Application No. PCT/US201/063900.
Office Communication notification dated Jul. 11, 2016 received in U.S. Appl. No. 14/587,702.
Office Action dated Feb. 1, 2017 received in co-pending U.S. Appl. No. 14/587,702.

\* cited by examiner

POLYMER INTERLAYERS HAVING IMPROVED OPTICAL PROPERTIES

CROSS REFERENCE TO RELATED APPLICATIONS

This application is a continuation of U.S. patent application Ser. No. 14/973,500 filed Dec. 17, 2015, now United States Publication Number 2016-0101604; which is a continuation of U.S. patent application Ser. No. 14/299,996, filed Jun. 9, 2014, which is now U.S. Pat. No. 9,254,625; which claims the benefit of U.S.

Provisional Patent Application No. 61/833,205, filed Jun. 10, 2013, the entire disclosures of which are incorporated by reference herein.

BACKGROUND OF THE INVENTION

1. Field of the Invention

This disclosure is related to the field of polymer interlayers for multiple layer panels and multiple layer panels having at least one polymer interlayer sheet. Specifically, this disclosure is related to the field of polymer interlayers having improved optical properties, and more specifically, to polymer interlayers comprising a high refractive index plasticizer.

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window. In regard to the photovoltaic applications, the main function of the interlayer is to encapsulate the photovoltaic solar panels which are used to generate and supply electricity in commercial and residential applications.

The interlayer may be a single layer, a combination of more than one single layer, a multilayer that has been coextruded, a combination of at least one single layer and at least one multilayer, or a combination of multilayer sheets.

In order to achieve the certain property and performance characteristics for the glass panel, it has become common practice to utilize multiple layer or multilayered interlayers. As used herein, the terms "multilayer" and "multiple layers" mean an interlayer having more than one layer, and multilayer and multiple layer may be used interchangeably. Multiple layer interlayers typically contain at least one soft layer and at least one stiff layer. Interlayers with one soft "core" layer sandwiched between two more rigid or stiff "skin" layers have been designed with sound insulation property for the glass panel. Interlayers having the reverse configuration, that is, with one stiff layer sandwiched between two more soft layers have been found to improve the impact performance of the glass panel. Examples of multiple layer interlayers also include the interlayers with at least one "clear" or non-colored layer and at least one colored layer. Other examples of multiple layer interlayers include interlayers with at least two layers with different colors. The colored layer typically contains pigments or dyes or some combination of pigments and dyes. The layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Contemplated polymer interlayers include, but are not limited to, polyvinyl acetals (PVA) (such as polyvinyl butyral (PVB)), polyurethane (PU), poly(ethylene-co-vinyl acetate) (EVA), polyvinylchloride (PVC), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins. Multilayer laminates can include multiple layer glass panels and multilayer polymer films. In certain embodiments, the multiple polymer films in the multilayer laminates may be laminated together to provide a multilayer film or interlayer. In certain embodiments, these polymer films may have coatings, such as metal, silicone or other applicable coatings known to those of ordinary skill in the art. The individual polymer films which comprise the multilayer polymer films may be laminated together using an adhesive as known to those of ordinary skill in the art. The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

One of the problems in the manufacture of multilayer laminate glass panels having multiple layer interlayers is the presence of mottle in the final unitary structure. The term "mottle" refers to an objectionable visual defect in the final unitary structure, namely the appearance of uneven spots, a form of optical distortion. Stated differently, mottle is a measure of the graininess or texture formed from the optical effect of reflecting non-uniform distorted interfaces of the inner polymer interlayer or polymer interlayers.

In multiple layer interlayers having at least one soft layer and at least one stiff layer, the mottle is caused by small scale surface variations at the interfaces between the layers wherein the individual layers (or the soft and stiff layers) have different refractive indices. When the polymer interlayer is produced, surface roughness is formed at the utmost surface of the polymer interlayer through melt fracture or embossing or both. The surface roughness enables and improves removal of air during laminating of polymer interlayers to produce multiple layer glass panels, and helps to prevent the blocking of the polymer interlayers during storage. Meanwhile, such surface roughness will also cause the development of small scale surface variation at the interfaces between layers of the multilayer interlayer.

The refractive index of a substance, such as an interlayer, is the measure of the speed of light through the substance with respect to the speed of light in vacuum. If there is a difference between the refractive index of the layers, the result will be that the surface variations are visible or even more visible due to diffraction of the light at the layer interfaces. Mottle is theoretically possible with any multiple layer interlayer, especially where there is a sufficiently large difference in the refractive indices between the layers and there is some degree of interfacial variation between the layers.

The presence of mottle in the final unitary structure of a multilayer laminate glass panel can be problematic because a certain degree of optical quality is necessary in many (if not most) of the end-use commercial applications of multilayer laminate glass panels (e.g., vehicular, aeronautical and architectural applications). Thus, the creation of multilayer laminate glass panels with commercially acceptable levels of mottle (that is, where the level of mottle is low) is paramount in the art of multiple layer glass panel manufacturing.

To ascertain the level of mottle in a laminate, the severity of the mottle is assessed and categorized by a side-to-side qualitative comparison of the shadowgraph projections for a test laminate with a set of standard laminate shadowgraphs representing a series or scale of mottle values ranging from 1 to 4, with 1 representing a standard of low mottle (i.e., a low number of disruptions) and 4 representing a standard of high mottle (i.e., a high number of disruptions), which is optically objectionable. Based upon a visual interpretation of which standard laminate shadowgraph picture the test shadowgraph projection best corresponds with, the test laminate is then placed into the mottle category of the corresponding standard laminate. Shadowgraph pictures can also be analyzed by digital image analysis tools to give digitalized results or mottle ratings.

Clarity of the multiple layer panel is another important optical quality. Clarity is determined by measuring the level of haze in the multiple layer panel, as further described below. The level of haze must be very low so that the multiple layer panel is clear. In addition to haze, there are other optical quality defects, such as visible optical defects in the interlayer, that cause light scattering and make the defect visible to the eye that may cause optical distortion in the glass panel as well. Both haze and other visible optical defects are caused by light scattering due to the blending or mixing of materials, such as different polymers or plasticizers, together, or the contamination from such different polymers or plasticizers where there is a sufficiently large difference in the refractive index between the different polymers or plasticizers, the matrix and the contaminants, or both.

Summarized, optical quality defects such as mottle, haze and other visible optical defects are common problems in the field of multiple layer glass panels, particularly those used in applications which require higher levels of optical or visual quality. It is now common to use a multilayer interlayer in order to provide high performance laminates. The use of multilayer interlayers, however, has very often resulted in having optical defect problems, such as mottle. Accordingly, there is a need in the art for the development of an interlayer, and particularly a multilayer interlayer, that resists or prevents the formation of mottle without a reduction in other optical, mechanical, and acoustic characteristics of a multilayer interlayer, and a need for the development of any polymer interlayers including monolithic and multilayer interlayers that are free from haze and other visible optical defects.

SUMMARY OF THE INVENTION

Because of these and other problems in the art, described herein, among other things is a polymer interlayer comprising: a poly(vinyl butyral) resin; and at least one high refractive index plasticizer. The polymer interlayer may be a multilayer polymer interlayer.

In an embodiment, a polymer interlayer comprises: poly(vinyl butyral) resin; and at least one high refractive index plasticizer having a refractive index of at least about 1.460; wherein the interlayer comprises about 5 to about 120 parts of the high refractive index plasticizer mixture per 100 parts poly(vinyl butyral) resin. In an embodiment, the high refractive index plasticizer has a refractive index of at least about 1.470. In an embodiment, the high refractive index plasticizer has a refractive index of at least about 1.480. In an embodiment, the high refractive index plasticizer has a refractive index of at least about 1.490. In an embodiment, the high refractive index plasticizer has a refractive index of from about 1.460 to about 1.560. In an embodiment, the difference between the refractive index of the resin and the refractive index of the high refractive index plasticizer is less than about 0.100, or less than about 0.075. In an embodiment, the difference between the refractive index of the resin and the refractive index of the high refractive index plasticizer is less than about 0.050. In an embodiment, the polymer interlayer comprises at least two different high refractive index plasticizers, wherein each high refractive index plasticizer has a refractive index of at least 1.460. In an embodiment, the polymer interlayer comprises at least two different plasticizers, wherein at least one plasticizer has a refractive index of at least 1.460 and wherein at least one plasticizer has a refractive index of less than about 1.450. In an embodiment, the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In an embodiment, the high refractive index plasticizer is selected from dipropylene glycol dibenzoate, 2,2,4-trimethyl-1,3-pentanediol dibenzoate, and tripropylene glycol dibenzoate. In an embodiment, the polymer interlayer further comprises a second plasticizer, wherein the second plasticizer is triethylene glycol di-(2-ethylhexanoate). In an embodiment, the refractive index of the polymer interlayer is at least 1.480.

In an embodiment, a polymer interlayer comprises: poly (vinyl butyral) resin; and a plasticizer mixture comprising: at least one plasticizer having a refractive index of less than about 1.450; and at least one high refractive index plasticizer having a refractive index of at least 1.460; wherein the refractive index of the plasticizer mixture is at least 1.460; and wherein the interlayer comprises about 5 to about 120 parts plasticizer mixture per 100 parts poly(vinyl butyral) resin. In an embodiment, the refractive index of the plasticizer mixture is at least 1.480. In an embodiment, the refractive index of the polymer interlayer is at least 1.480.

In an embodiment, a polymer interlayer comprises: poly (vinyl butyral) resin; and at least one high refractive index plasticizer having a refractive index of at least about 1.460; wherein the interlayer comprises about 5 to about 120 parts of the high refractive index plasticizer mixture per 100 parts poly(vinyl butyral) resin, and wherein the refractive index of the polymer interlayer is at least 1.480. In an embodiment, the difference between the refractive index of the resin and the refractive index of the high refractive index plasticizer is less than about 0.100, or less than about 0.075. In an embodiment, the difference between the refractive index of the resin and the refractive index of the high refractive index plasticizer is less than about 0.050. In an embodiment, the polymer interlayer comprises at least two different high refractive index plasticizers, wherein each high refractive index plasticizer has a refractive index of at least 1.460. In an embodiment, the polymer interlayer comprises at least two plasticizers, wherein at least one plasticizer has a refractive index of at least 1.460 and wherein at least one plasticizer has a refractive index of less than about 1.450.

In an embodiment, a multiple layer polymer interlayer comprises: poly(vinyl butyral) resin; and at least one high refractive index plasticizer having a refractive index of at least about 1.460; wherein the multiple layer polymer interlayer has at least one soft layer and at least one stiff layer, and wherein the difference between the refractive index of the soft layer and the stiff layer (Delta RI) is less than about 0.010. In embodiments, the high refractive index plasticizer has a refractive index of from about 1.460 to about 1.560. In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In embodiments, the soft layer has a plasticizer content of from 10 phr to 120 phr, and the stiff layer has a plasticizer content of from 5 phr to 60 phr. In embodiments, the polymer interlayer comprises at least two different high refractive plasticizers, wherein each high refractive plasticizer has a refractive index of at least 1.460. In embodiments, the polymer interlayer comprises at least two different plasticizers, wherein at least one plasticizer has a refractive index of at least 1.460 and wherein at least plasticizer has a refractive index of less than about 1.450. In embodiments, the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In embodiments, the high refractive index plasticizer is selected from dipropylene glycol dibenzoate, tripropylene glycol dibenzoate, and 2,2,4-trimethyl-1,3-pentanediol dibenzoate. In embodiments, the multiple layer polymer interlayer further comprises a second plasticizer, wherein the second plasticizer is triethylene glycol di-(2-ethylhexanoate). In embodiments, the multiple layer polymer interlayer further comprises a second stiff layer, and wherein the soft layer is disposed between the stiff layers, or a second soft layer and wherein the stiff layer is disposed between the soft layers.

In an embodiment, a polymer interlayer is disclosed, the polymer interlayer comprising: poly(vinyl butyral) resin; and at least one high refractive index plasticizer having a refractive index of at least about 1.460; wherein the interlayer comprises about 5 to about 120 parts of the high refractive index plasticizer per 100 parts poly(vinyl butyral) resin. In embodiments, the multiple layer polymer interlayer has at least one soft layer and at least one stiff layer, and wherein the difference between the refractive index of the soft layer and the stiff layer (Delta RI) is less than about 0.010.

In embodiments, the high refractive index plasticizer has a refractive index of at least about 1.470, or at least about 1.480, or at least about 1.490, or at least about 1.500, or at least about 1.510, or at least about 1.520.

In embodiments, the difference between the refractive index of the resin and the refractive index of the plasticizer may be less than about 0.100, or less than about 0.075, or less than about 0.070, or less than about 0.065, or less than about 0.060, or less than about 0.055, or less than about 0.050, or less than about 0.040, or less than about 0.030, or less than about 0.020, or less than about 0.010, or about 0.000.

In embodiments, the polymer interlayer may comprise at least two different high refractive index plasticizers, wherein each high refractive index plasticizer has a refractive index of at least 1.460, or the polymer interlayer may comprise at least two different plasticizers, wherein at least one plasticizer has a refractive index of at least 1.460 and wherein at least plasticizer has a refractive index of less than about 1.450.

In embodiments, the polymer interlayer has a refractive index of at least 1.480, or at least 1.485.

In embodiments, the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof, or the plasticizer may be selected from dipropylene glycol dibenzoate, 2,2,4-trimethyl-1,3-pentanediol dibenzoate, and tripropylene glycol dibenzoate.

In embodiments, the polymer interlayer may further comprise an additional plasticizer. In embodiments, the additional plasticizer is triethylene glycol di-(2-ethylhexanoate).

In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %.

In another embodiment, a multiple layer polymer interlayer comprises: poly(vinyl butyral) resin; and a plasticizer mixture comprising: at least one plasticizer selected from the group consisting of: triethylene glycol di-(2-ethylhexanoate), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, bis(2-(2-butoxyethoxy)ethyl) adipate, dibutyl sebacate, and dioctyl sebacate; and at least one high refractive index plasticizer having a refractive index of at least 1.460; wherein the refractive index of the plasticizer mixture is at least 1.460; wherein the multiple layer polymer interlayer has at least one soft layer and at least one stiff layer, and wherein the difference between the refractive index (Delta RI) of the soft layer and the stiff layer is less than about 0.010. In embodiments, the plasticizer mixture has a refractive index of from about 1.460 to about 1.560. In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In embodiments, the soft layer has a plasticizer content of from 10 phr to 120 phr, and the stiff layer has a plasticizer content of from 5 phr to 60 phr. In embodiments, the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In embodiments, the multiple layer polymer interlayer further comprises a second stiff layer, and wherein the soft layer is disposed between the stiff layers or a second soft layer and wherein the stiff layer is disposed between the soft layers.

In another embodiment, a multiple layer polymer interlayer comprises: poly(vinyl butyral) resin; and at least one high refractive index plasticizer having a refractive index of at least about 1.460; wherein the multiple layer polymer interlayer has at least one soft layer and at least two stiff layers wherein the soft layer is disposed between the stiff layers, and wherein the difference between the refractive index of the soft layer and the stiff layers is less than about 0.010. In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In embodiments, the soft layer has a plasticizer content of from 10 phr to 120 phr, and the stiff layer has a plasticizer content of from 5 phr to 60 phr. In embodiments, the polymer interlayer comprises at least two different high refractive index plasticizers, wherein each high refractive index plasticizer has a refractive index of at least 1.460.

In another embodiment, a multiple layer polymer interlayer comprises: poly(vinyl butyral) resin; and at least one high refractive index plasticizer having a refractive index of at least about 1.460; wherein the multiple layer polymer interlayer has at least one soft layer and at least one stiff layer, and wherein the difference between the refractive index of the soft layer and the stiff layer (Delta RI) is less than about 0.010.

In another embodiment, a polymer interlayer comprising: poly(vinyl butyral) resin; and a plasticizer mixture comprising: at least one plasticizer selected from the group consisting of: triethylene glycol di-(2-ethylhexanoate), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate; and at least one high refractive index plasticizer having a refractive index of at least 1.460; wherein the refractive index of the plasticizer mixture is at least 1.460; and wherein the interlayer comprises about 5 to about 120 parts plasticizer mixture per 100 parts poly(vinyl butyral) resin is disclosed. In embodiments, the high refractive index plasticizer has a refractive index of at least about 1.470, or at least about 1.480, or at least about 1.490, or at least about 1.500, or at least about 1.510, or at least about 1.520. In embodiments, the refractive index of the plasticizer mixture is at least about 1.470, or at least about 1.480, or at least about 1.490. In embodiments, the polymer interlayer has a refractive index of at least 1.480, or at least 1.485. In embodiments, at least one plasticizer is triethylene glycol di-(2-ethylhexanoate). In certain embodiments, the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof, or the high refractive index plasticizer is selected from dipropylene glycol dibenzoate, 2,2,4-trimethyl-1,3-pentanediol dibenzoate, and tripropylene glycol dibenzoate, or one plasticizer is triethylene glycol di-(2-ethylhexanoate) and the high refractive index plasticizer is selected from dipropylene glycol dibenzoate, 2,2,4-trimethyl-1,3-pentanediol dibenzoate, and tripropylene glycol dibenzoate.

A multiple layer polymer interlayer comprising: poly(vinyl butyral) resin; and at least one high refractive index plasticizer having a refractive index of at least about 1.460; wherein the multiple layer polymer interlayer has at least one soft layer and at least one stiff layer, and wherein the difference between the refractive index of the soft layer and the stiff layer is less than about 0.010 is also disclosed. In embodiments, the difference between the refractive index of the soft layer and the stiff layer is less than about 0.009, less than about 0.008, less than about 0.007, less than about 0.006, less than about 0.005, less than about 0.004, less than about 0.003, less than about 0.002, less than about 0.001, or about 0.000. The plasticizer may have a refractive index of at least about 1.470, or at least about 1.480, or at least about 1.490, or at least about 1.500, or at least about 1.510, or at least about 1.520. In embodiments, the polymer interlayer has a refractive index of at least 1.480. In embodiments, the polymer interlayer comprises at least two different high refractive index plasticizers, wherein each high refractive index plasticizer has a refractive index of at least 1.460, or the polymer interlayer comprises at least two different plasticizers, wherein at least one plasticizer has a refractive index of at least 1.460 and wherein at least one plasticizer has a refractive index of less than about 1.450. The high refractive index plasticizer may be selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof, or the high refractive index plasticizer may be selected from dipropylene glycol dibenzoate, 2,2,4-trimethyl-1,3-pentanediol dibenzoate, and tripropylene glycol dibenzoate. In an embodiment, the polymer interlayer may further comprise an additional plasticizer. In an embodiment, the additional plasticizer is triethylene glycol di-(2-ethylhexanoate). In an embodiment, the polymer interlayer may further comprise a second stiff layer, and wherein the soft layer is disposed between the two stiff layers. In an embodiment, the polymer interlayer may further comprise a second soft layer, wherein the stiff layer is disposed between the two soft layers. In embodiments, the polymer interlayer may comprise additional soft and/or stiff layers.

In another embodiment, a multiple layer polymer interlayer is disclosed, the multiple layer polymer interlayer comprising: poly(vinyl butyral) resin; and a plasticizer mixture comprising: at least one plasticizer selected from the group consisting of: triethylene glycol di-(2-ethylhexanoate), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, and bis(2-(2-butoxyethoxy)ethyl) adipate; and at least one high refractive index plasticizer having a refractive index of at least 1.460; wherein the refractive index of the plasticizer mixture is at least about 1.460; wherein the multiple layer polymer interlayer has at least one soft layer and at least one stiff layer, and wherein the difference between the refractive index of the soft layer and the stiff layer is less than about 0.010. The difference between the refractive index of the soft layer and the stiff layer may be less than about 0.009, less than about 0.008, less than about 0.007, less than about 0.006, less than about 0.005, less than about 0.004, less than about 0.003, less than about 0.002, less than about 0.001, or about 0.000. In an embodiment, the polymer interlayer may further comprise a second stiff layer, and wherein the soft layer is disposed between the two stiff layers. In an embodiment, the polymer interlayer may further comprise a second soft layer, wherein the stiff layer is disposed between the two soft layers. In embodiments, the polymer interlayer may comprise additional soft and/or stiff layers.

In another embodiment, a multiple layer polymer interlayer comprises: poly(vinyl butyral) resin; and at least one high refractive index plasticizer having a refractive index of at least about 1.460; wherein the multiple layer polymer interlayer has at least one soft layer and at least two stiff layers wherein the soft layer is disposed between the stiff layers, and wherein the difference between the refractive index of the soft layer and the stiff layers is less than about 0.010. In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In embodiments, the soft layer has a plasticizer content of from 10 phr to 120 phr, and the stiff layer has a plasticizer content of from 5 phr to 60 phr. In embodiments, the polymer interlayer comprises at least two different high refractive index plasticizers, wherein each high refractive index plasticizer has a refractive index of at least 1.460.

In an embodiment, a multiple layer polymer interlayer comprises: a first layer comprising poly(vinyl butyral) resin and a first plasticizer; a second layer comprising poly(vinyl butyral) resin and a second plasticizer; and a third layer comprising poly(vinyl butyral) resin and a third plasticizer disposed between the first layer and the second layer; and wherein at least one of the first, second and third plasticizers is a high refractive index plasticizer having a refractive index of at least about 1.460; wherein at least one layer is a soft layer and at least one layer is a stiff layer, and wherein the difference between the refractive index of the soft layer and the stiff layer (Delta RI) is less than about 0.010. In an embodiment, the high refractive index plasticizer has a refractive index of from about 1.460 to about 1.560. In an embodiment, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In an embodiment, the soft layer has a plasticizer content of from 10 phr to 120 phr, and the stiff layer has a plasticizer content of from 5 phr to 60 phr. In an embodiment, the multiple layer interlayer comprises at least two different high refractive plasticizers, wherein each high refractive index plasticizer has a refractive index of at least 1.460. In an embodiment, the at least two high refractive plasticizers are in the same layer. In another embodiment, the at least two high refractive plasticizers are in different layers. In an embodiment, the multilayer interlayer comprises at least two different plasticizers, wherein at least one plasticizer has a refractive index of at least 1.460 and wherein at least one plasticizer has a refractive index of less than about 1.450. In an embodiment, the first and second layers comprise at least one plasticizer having a refractive index of at least 1.460, and wherein the third layer comprises at least one plasticizer having a refractive index of less than 1.450. In an embodiment, the third layer comprises at least one plasticizer having a refractive index of at least 1.460, and wherein the first and second layers comprise at least one plasticizer having a refractive index of less than 1.450. In an embodiment, the first and second layers are stiff layers, and wherein the third layer is a soft layer. In an embodiment, the first and second layers are soft layers, and wherein the third layer is a stiff layer.

In an embodiment, a multiple layer polymer interlayer comprises: a first layer comprising poly(vinyl butyral) resin and a first plasticizer; a second layer comprising poly(vinyl butyral) resin and a second plasticizer; and a third layer comprising poly(vinyl butyral) resin and a third plasticizer disposed between the first layer and the second layer; wherein at least one of the first, second and third plasticizers is a mixture comprising: at least one plasticizer having a refractive index of less than about 1.450; and at least one high refractive index plasticizer having a refractive index of at least 1.460; wherein the refractive index of the plasticizer mixture is at least 1.460; wherein at least one of the layers is a soft layer and at least one of the layers is a stiff layer, and wherein the difference between the refractive index (Delta RI) of the soft layer and the stiff layer is less than about 0.010. In an embodiment, the plasticizer mixture has a refractive index of from about 1.460 to about 1.560. In an embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In an embodiment, the soft layer has a plasticizer content of from 10 phr to 120 phr, and the stiff layer has a plasticizer content of from 5 phr to 60 phr.

In an embodiment, a multiple layer polymer interlayer comprises: a first stiff layer comprising poly(vinyl butyral) resin and a first plasticizer, wherein the first plasticizer is present in an amount of from 5 phr to 60 phr; a second stiff layer comprising poly(vinyl butyral) resin and a second plasticizer, wherein the second plasticizer is present in an amount of from 5 phr to 60 phr; and a first soft layer comprising poly(vinyl butyral) resin and a third plasticizer, wherein the third plasticizer is present in an amount of from 10 phr to 120 phr, and wherein the first soft layer is disposed between the first stiff layer and the second stiff layer; wherein at least one of the first, second and third plasticizers is a high refractive index plasticizer having a refractive index of at least about 1.460; wherein the difference between the refractive index of the soft layer and the stiff layers is less than about 0.010. In embodiments, the soft layer comprises a poly(vinyl butyral) resin having a residual hydroxyl content from 8 to 21 wt. %, and the stiff layer comprises a poly(vinyl butyral) resin having a residual hydroxyl content from 16 to 35 wt. %, and the residual hydroxyl content between the adjacent soft and stiff layers differs by at least 2 wt. %. In embodiments, the polymer interlayer comprises at least two different high refractive index plasticizers, wherein each high refractive index plasticizer has a refractive index of at least 1.460. In embodiments, the multilayer interlayer comprises at least two different plasticizers, wherein at least one plasticizer has a refractive index of at least 1.460 and wherein at least one plasticizer has a refractive index of less than about 1.450.

A multiple layer panel is also disclosed. The multiple layer panel comprises at least one rigid substrate, and a polymer interlayer or multiple layer polymer interlayer as disclosed herein. The panel has improved optical properties.

A method of making a polymer interlayer is also disclosed, wherein the multilayer interlayer comprises a poly(vinyl butyral) resin and at least one high refractive index plasticizer, as disclosed herein. The polymer interlayer may be a multiple layer polymer interlayer.

In certain embodiments, the rigid substrate is glass. In other embodiments, the panel may further comprise a photovoltaic cell, with the interlayer encapsulating the photovoltaic cell.

DESCRIPTION OF THE PREFERRED EMBODIMENT(S)

Described herein, among other things, are interlayers comprised of a thermoplastic resin, at least one high refractive index plasticizer, and optionally a conventional plasticizer, wherein the interlayers have improved optical quality. Also described are multiple layer glass panels comprising the interlayers, and methods of making the polymer interlayers. The use of a thermoplastic resin, and at least one high refractive index plasticizer having a refractive index of at least about 1.460, or at least about 1.470, or greater than about 1.470, or at least about 1.480, or greater than about 1.480, or at least about 1.490, or greater than about 1.490, or at least about 1.500, or greater than about 1.500, or at least about 1.510, or greater than 1.520, creates an interlayer having decreased mottle and/or low haze without sacrificing other characteristics. In this regard, the use of at least one high refractive index plasticizer or combination of plasticizers, when selected to have a certain refractive index compared to interlayers comprising only conventional plasticizer, and the resin and other additives, results in an interlayer having excellent optical properties as measured by at least mottle and haze. As a result, higher quality, optically clear multiple layer glass panels are produced, less scrap or off grade material is generated, and operational efficiency is improved. As noted here, the refractive index (also known as index of refraction) of a plasticizer or a resin used in the entirety of this disclosure is either measured in accordance with ASTM D542 at a wavelength of 589 nm and 25° C. or reported in literature in accordance with the ASTM D542.

Multilayer interlayers, such as an interlayer having two or more layers (such as a trilayer interlayer having three layers), often comprise at least one soft layer and at least one stiff layer. The soft layer(s) is often the inner or core layer in interlayers having at least three layers. The soft core layer(s) may be specifically designed for acoustic attenuation, and the polymer interlayer may have stiffer skin or outer layers. In the interlayer comprising poly(vinyl butyral) ("PVB") resin and plasticizer, it has been common that plasticizer is selected the group of triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, and bis(2-(2-butoxyethoxy)ethyl) adipate, and mixtures thereof. These plasticizers have refractive indices of 1.442 to 1.449. As used herein, the plasticizer having a refractive index of about 1.450 or less is referred as "conventional plasticizer". 3GEH (refractive index=1.442) is the most common plasticizer present in interlayers manufactured for various properties and applications. In the multilayer interlayer having conventional plasticizer, the plasticizer (such as triethylene glycol di-(2-ethylhexanoate) (3GEH)) in the core and skin layers often partitions (as it reaches equilibrium state) in favor of the softer layer over the stiffer or harder layer, in a proportion predominated by the characteristics of the particular resins used in the skin and core layers. Because PVB resin has a refractive index of approximately 1.485 to 1.495, and because more plasticizer ends up in the softer layer than in the stiffer layer, the softer layer has a different, and lower, refractive index than the stiffer layer, creating a refractive index ("RI") difference ("Delta RI") between the layers. It has been determined that this difference in refractive index contributes to an undesirable optical defect known as mottle or the mottle defect.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the name implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of a single-layer sheet and a plural-layer sheet; and a combination of at least one plural-layer sheet and at least one co-extruded sheet. In various embodiments of the present disclosure, a multilayered interlayer comprises at least two polymer layers (e.g., a single layer or multiple layers co-extruded and/or laminated together) disposed in direct contact with each other, wherein each layer comprises a polymer resin, as detailed more fully below. As used herein for multilayer interlayers having at least three layers, "skin layer" generally refers to the outer layers of the interlayer and "core layer" generally refers to the inner layer(s). Thus, one exemplary embodiment would be: skin layer//core layer//skin layer. As used herein, "stiff layer" or "stiffer layer" generally refers to a layer that is stiffer or more rigid than another layer and that has a glass transition temperature that is generally at least two degrees C. (2° C.) higher than another layer. As used herein, the "soft layer" or "softer layer" generally refers to a layer that is softer than another layer and that has a glass transition temperature that is generally at least two degrees C. (2° C.) lower than another layer. The soft layer and stiff layer can be differentiated when both layers contain the same plasticizer and each has a plasticizer loading of 30 phr. The soft layer and stiff layer can be further differentiated when the soft and stiff layers are in contact with each other and the plasticizer partitions to reach equilibrium state between the layers. Of course, this differentiation can also be made at other plasticizer loadings as long as the loadings are within limits of compatibility of the plasticizer to resins. In the multilayer interlayers having skin layer//core layer//skin layer configuration, in some embodiments the skin layer maybe stiffer and the core layer may be softer, while in other embodiments the skin layer may be softer and the core layer may be stiffer. It should be noted, however, further embodiments include interlayers having only two layers or interlayers having more than three layers (e.g., 4, 5, 6, or up to 10 or more individual layers). Additionally, any multilayer interlayer utilized can be varied by manipulating the composition, thickness, or positioning of the layers and the like. For example, in one trilayer polymer interlayer sheet, the two stiff (or outer or skin) layers may comprise poly(vinyl butyral) ("PVB") resin with a plasticizer or mixture of plasticizers, while the softer (inner or core) layers may comprise the same or different PVB resin or a different thermoplastic material with a the same or different plasticizer and/or mixture of plasticizers. Thus, it is contemplated that the stiff or skin layers and the soft or core layer(s) of the multilayered interlayer sheets may be comprised of the same thermoplastic material or different thermoplastic materials and the same or different plasticizer or plasticizers. Either or both layers may include additional additives as known in the art, as desired. In multilayer interlayers, the plasticizers or mixture of plasticizers in the stiff or skin and soft or core layers are selected such that the difference in refractive indices of the stiff or skin layer(s) and soft or core layer(s) is minimized, and the mottle is reduced. For example, in some embodiments, the difference between the refractive index of the soft or core layer(s) and the refractive index of the stiff or skin layer(s) (Delta RI) may be less than 0.010, or less than 0.009, or less than 0.008, or less than 0.007, or less than 0.006, or less than 0.005, or less than 0.004, or less than 0.003, or less than 0.002, or less than 0.001, or even about 0.000. The Delta RI may be positive or negative, or may be taken as the absolute value of the difference between the layers. In some embodiments, the difference between the refractive index of the resin and the refractive index of the plasticizer (Delta RI) may be less than 0.100, or less than 0.075, or less than 0.070, or less than 0.065, or less than 0.060, or less than 0.055, or less than 0.050, or less than 0.040, or less than 0.030, or less than 0.020, or less than 0.010, or about 0.000.

Although the embodiments described below refer to the polymer resin as being PVB, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB)), polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB, polyvinyl chloride, and polyurethane are useful polymers generally for interlayers; PVB is particularly useful when used in conjunction with the interlayers of this disclosure comprising high refractive index plasticizers.

Prior to discussing the addition of the specific plasticizer or plasticizers selected to produce the interlayer having improved optical quality, some common components found in an interlayer, both generally and in interlayers of the present disclosure, and the formation thereof, will be discussed.

The PVB resin is produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a wholly owned subsidiary of Eastman Chemical Company.

As used herein, residual hydroxyl content (calculated as % PVOH by weight) in PVB refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the PVB resin comprises about 8 to about 35 weight percent (wt. %) hydroxyl groups calculated as % PVOH, about 13 to about 30 wt. %, about 8 to about 22 wt. %, or about 15 to about 22 wt. %; and, for certain embodiments, about 17.75 to about 19.85 wt. % hydroxyl groups calculated as % PVOH. The resin can also comprise less than 25 wt. % residual ester groups, less than 20 wt. % residual ester groups, less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as a 2-ethyl hexanal acetal group, or a mix of butyraldehyde acetal and 2-ethyl hexanal acetal groups.

In various embodiments, where the interlayer is a multi-layer interlayer such as a trilayer, the residual hydroxyl contents of the PVB resins used in the stiff (or skin) layer(s) and soft (or core) layer(s) can be different to provide certain performance characteristics. The resin for the soft layer(s), for example, can comprise about 8 to about 21 wt. %, about 8 to about 18 wt. %, or about 8 to about 16 wt. %, or about 8 to about 14 wt. % residual hydroxyl groups calculated as % PVOH. The resin for the stiff layer(s), for example, can comprise about 13 to about 35 wt. %, about 16 to about 35 wt. %, or about 15 to about 22 wt. %; and, for certain embodiments, about 17.25 to about 22.25 wt. % residual hydroxyl groups calculated as % PVOH. In various embodiments, the residual hydroxyl content of adjacent stiff and soft layers can differ by at least 2 wt. %, or at least 4 wt. %, or at least 6 wt. %, or at least 8 wt. %, or at least by 10 wt. %. The resin for the soft layer(s) or for the stiff layer(s) or for both the soft layer(s) and stiff layer(s) can also comprise less than 25 wt. % residual ester groups, less than 20 wt. % residual ester groups, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as a 2-ethyl hexanal acetal group, or a mix of butyraldehyde acetal and 2-ethyl hexanal acetal groups, as previously discussed.

In various embodiments, where the interlayer is a multi-layer interlayer such as a trilayer, the skin layer(s) could have higher residual hydroxyl groups calculated as % PVOH than the core layer(s), or the skin layer(s) could be stiffer than the core layer(s); in other embodiments, the skin layer(s) could have lower residual hydroxyl groups calculated as % PVOH than the core layer(s), or the skin layer(s) could be softer. If there are more than two or three layers, any combination of stiff/soft/stiff/soft, such as soft/stiff/soft/stiff, soft/stiff/stiff/soft, stiff/soft/soft/stiff, and any number of layers, may be used, depending on the desired properties and application.

For a given type of plasticizer, the compatibility of the plasticizer in the PVB polymer is largely determined by the hydroxyl content of the polymer. PVB with greater residual hydroxyl content is typically, but not always, correlated with reduced plasticizer compatibility or capacity, i.e., less plasticizer could be incorporated. Conversely, PVB with a lower residual hydroxyl content typically, but not always, will result in increased plasticizer compatibility or capacity, i.e., more plasticizer could be incorporated. For some plasticizer types, such correlation might be reversed. Generally, this correlation between the residual hydroxyl content of a polymer and plasticizer compatibility/capacity will allow for the addition of the proper amount of plasticizer to the polymer resin and more importantly to stably maintain differences in plasticizer content between multiple layers.

The PVB resin (or resins) of the present disclosure typically has a molecular weight of greater than 50,000 Daltons, or less than 500,000 Daltons, or about 50,000 to about 500,000 Daltons, or about 70,000 to about 500,000 Daltons, or more preferably about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the interlayer sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis (2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

In various embodiments of interlayers of the present disclosure, the interlayer can comprise 0 to about 100 or more, 0 to about 80, about 0 to 45, about 10 to about 75, about 15 to about 60, about 15 to about 50, about 25 to about 50, about 10 to about 40, about 15 to about 40, about 25 to about 38, about 29 to about 32, and about 30 phr (parts per hundred parts resin) conventional plasticizer. Of course, other quantities can be used as is appropriate for the particular application and the desired properties.

In various embodiments of interlayers of the present disclosure, the interlayer comprises greater than 5 phr, about 5 to about 120 phr, about 5 to 100, about 10 to about 80 phr, about 20 to about 70 phr, about 30 to about 60 phr, or less than 120 phr, or less than 110 phr, or less than 100 phr, or less than 90 phr, or less than 80 phr, or less than 70 phr, or less than 60 phr total plasticizer. While the total plasticizer content is indicated above, the plasticizer content in the skin layer(s) or core layer(s) can be different from the total plasticizer content. In addition, the skin layer(s) and core layer(s) can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two skin layers, each with 38 phr plasticizer, and a core layer with 75 phr plasticizer, for a total plasticizer amount for the interlayer of about 54.3 phr when the combined skin layer thickness equals that of the core layer. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the mix or melt that was used to produce the interlayer. In embodiments of a multilayer interlayer having a stiff layer and a soft layer, the stiff layer may have from 5 to 60 phr plasticizer and the soft layer may have from 10 to 120 phr plasticizer.

In some embodiments, the conventional plasticizer includes, for example, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, bis(2-(2-butoxyethoxy)ethyl) adipate, and mixtures thereof. In some embodiments, the conventional plasticizer is 3GEH.

Increasing the refractive index of one or more of the layers, such as a soft or core layer, to be closer to the refractive index of the other layer(s) can minimize the difference in refractive index between the layers (such as the stiff (or skin) and soft (or core) layers), thereby minimizing the amount of mottle in the multilayer interlayer. One way to increase the refractive index of one of the layers is to use a high refractive index plasticizer. As used herein, a "high refractive index plasticizer" is a plasticizer having a refractive index of at least about 1.460. The refractive index of one conventional and commonly used plasticizer, such as 3GEH, is about 1.442. The refractive indices of the conventional plasticizers listed above are from about 1.442 to about 1.449. Examples of plasticizers having a high refractive index that may be used include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). The refractive index of poly(vinyl butyral) resin is approximately 1.485 to 1.495.

Examples of the high refractive index plasticizer include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, examples of high refractive index plasticizers are dipropylene glycol dibenzoate, 2,2,4-trimethyl-1,3-pentanediol dibenzoate, and tripropylene glycol dibenzoate.

In multilayer interlayers, comprising, for example, stiff and soft layers, the stiff and soft layers could each comprise a conventional plasticizer in combination with a one or more high refractive index plasticizer, or comprise a single high refractive index plasticizer alone or a combination of high refractive index plasticizers, so long as the difference in the refractive indices (Delta RI) between layers is minimized. Concentrations of the plasticizers incorporated into the melts of the different layers, such as the soft or stiff layers, are as described above.

In any of these embodiments, the plasticizer(s) can be any of those described above. In embodiments, the plasticizer(s) is selected such that the Delta RI between the layers of the interlayer is minimized (that is, as close to 0.000 as possible), or less than 0.010, or less than 0.009, or less than 0.008, or less than 0.007, or less than 0.006, or less than 0.005, or less than 0.004, or less than 0.003, or less than 0.002, or less than 0.001, or about 0.000. In other embodiments, the plasticizer is selected such that the Delta RI between the resin and plasticizer is less than 0.075, or less than 0.070, or less than about 0.065, or less than 0.060, or less than 0.055, or less than 0.050, or less than 0.040, or less than 0.030, or less than 0.020, or less than 0.010, or about 0.000. In various embodiments, the high refractive index plasticizer(s) is selected such that the refractive index of the plasticizer is at least about 1.460, or greater than about 1.470, or greater than about 1.480, or greater than about 1.490, or greater than about 1.500, or greater than 1.510, or greater than about 1.520. In some embodiments, the high refractive index plasticizer(s) is used in conjunction with a conventional plasticizer, and in some embodiments, if included, the conventional plasticizer is triethylene glycol di-(2-ethylhexanoate) ("3GEH"). In some embodiments, the refractive index of the plasticizer mixture is at least greater than 1.460.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the polymer to the rubbery state. In general, higher amounts of plasticizer loading will result in lower $T_g$. Conventional interlayers generally have a $T_g$ in the range of about 0° C. for acoustic (noise reducing) interlayer to about 45° C. for hurricane and aircraft interlayer applications. A particularly preferred $T_g$ for certain embodiments is in the range of about 28° C. to about 35° C. for the stiffer layer(s) and about −2° C. to about 5° C. for the softer layer(s).

An interlayer's glass transition temperature ($T_g$) is also correlated with the stiffness of the interlayer, and in general, the higher the glass transition temperature, the stiffer the interlayer. Generally, an interlayer with a glass transition temperature of 30° C. or higher increases windshield strength and torsional rigidity. A soft interlayer (generally characterized by an interlayer with a glass transition temperature of lower than 30° C.), on the other hand, contributes to the sound dampening effect (i.e., the acoustic characteristics). The interlayers of the present disclosure may have glass transition temperatures of about 30° C. or greater, or about 35° C. or greater for the stiffer layer(s), and about 10° C. or less, or about 4° C. or less, or about −5° C. or less, or about −10° C. or less for the soft layer(s). In some embodiments, the multilayered interlayers of the present disclosure combine these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft), while also matching the refractive indices of the layers to reduce and/or minimize or eliminate mottle. In various embodiments, the multilayered interlayers generally comprise stiffer layer(s) with a glass transition temperature of about 25° C. to about 40° C., about 20° C. to about 35° C., about 25° C. to 35° C., about 25° C. or greater, about 30° C. or greater, and about 35° C. or greater, and softer layer(s) of about 10° C. or less, or about 4° C. or less, or about −5° C. or less, or about −10° C. or less. For example, the following are some typical multilayered configurations:

- ($T_g$>25° C.)//($T_g$<10° C.)//($T_g$>25° C.) or (stiff//soft//stiff);
- (25° C.<$T_g$<40° C.)//($T_g$<10° C.)//(25° C.<$T_g$<40° C.) or (stiff//soft//stiff);
- ($T_g$<35° C.)//($T_g$>35° C.)//($T_g$<35° C.) or (soft//stiff//soft); and
- (20° C.<$T_g$<35° C.)//($T_g$>35° C.)//(20° C.<$T_g$<35° C.) or (soft//stiff//soft).

These configurations are merely exemplary and are in no way meant to be limiting to the types of multilayered configurations contemplated by this disclosure.

Additionally, it is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate and photovoltaic module of the present invention are formed using processes known in the art.

In its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins and plasticizers described above, are pre-mixed and fed into an extruder device. Additives such as ACAs, colorants and UV inhibitors (in liquid, powder, or pellet form) are often used and can be mixed into the thermoplastic resin or plasticizer(s) prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

In the extruder device, the particles of the thermoplastic raw material and plasticizers, and any other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final-form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of multiple different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass) II (polymer interlayer sheet) II (polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass) II (polymer interlayer) II (photovoltaic cell) II (polymer interlayer) II (glass or polymer film).

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass) II (polymer interlayer sheet) II (glass), where the polymer interlayer sheet can comprise multilayered interlayers, as noted above, and wherein the layers of the multilayer interlayer comprise refractive index matching plasticizers or one or more high refractive index plasticizer or combination of plasticizers wherein the refractive index of the mixture or combination is within the desired range. Stated differently, the Delta RI between the layers is minimized (less than 0.010), or the Delta RI between the resin and plasticizer is minimized (less than 0.100 or less than 0.075), or the plasticizer is a high refractive index plasticizer (at least about 1.460), such that mottle in the multiple layer panel is reduced, and the clarity of the multiple layer panel is excellent (that is, having minimal haze). These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first desiring; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes. The actual steps, as well as the times and temperatures, may vary as necessary, as known by one skilled in the art.

Other means for use in de-airing of the interlayer-glass interfaces (steps 2-5) known in the art and that are commercially practiced include vacuum bag and vacuum ring processes in which a vacuum is utilized to remove the air.

Mottle is one measure of optical quality of a laminate. It is seen as texture or graininess and is considered a visual defect if the level of mottle is too high or too severe (and thus objectionable). As previously discussed, mottle is assessed and categorized by a side-to-side qualitative comparison of the shadowgraph projections for a test laminate with a set of standard laminate shadowgraphs representing a series or scale of mottle values ranging from 1 to 4, with 1 representing a standard of low mottle (i.e., a low number of disruptions) and 4 representing a standard of high mottle (i.e., a high number of disruptions). High mottle is generally considered optically objectionable, particularly in glass panels such as windshields. Optionally, a laminate having a single layer interlayer with zero mottle (or no mottle) is used to facilitate the evaluation of mottle in the test laminate with a mottle rating lower than the scale of the standard set, such as lower than a rating of 1. The test laminate that shows a shadowgraph projection similar to that of a "zero" mottle laminate is assessed to have a mottle rating of zero (0).

Another parameter used to describe the polymer interlayers disclosed herein is the clarity, which is determined by measuring the haze value or percent. Light that is scattered upon passing through a film or sheet of a material can produce a hazy or smoky field when objects are viewed through the material. Thus, the haze value is a quantification of the scattered light by a sample in contrast to the incident light. The test for percent haze is performed with a hazemeter, such as Model D25 available from Hunter Associates (Reston, Va.), and in accordance with ASTM D1003-61 (Re-approved 1977)—Procedure A using Illuminant C, at an observer angle of 2 degrees. The interlayers of the present disclosure have a percent haze of less than about 5%, less than about 4%, less than about 3%, less than about 2%, less than about 1%, or less than about 0.5%.

The glass transition temperature also is used to describe the polymer interlayers of the present disclosure. The glass transition temperature ($T_g$) was determined by dynamical mechanical thermal analysis (DMTA). The DMTA measures the storage (elastic) modulus (G') in Pascals, loss (viscous) modulus (G") in Pascals, loss (damping) factor (LF or tan(delta)) of the specimen as a function of temperature at a given frequency, and temperature sweep rate. A frequency of 1 Hz and temperature sweep rate of 3° C./min were used herein. The $T_g$ is then determined by the position of the loss factor peak on the temperature scale in ° C.

Pummel adhesion is another parameter used to describe the polymer interlayers disclosed herein. The Pummel Adhesion Test is widely used throughout the world and has been a standard Solutia Inc., a subsidiary of Eastman Chemical Company, procedure for over 30 years. It measures the adhesion level of glass to the interlayer in a laminate construction. The interlayer to glass adhesion has a large effect on the impact resistance and long term stability of glass-interlayer structures. In this test, the laminates are cooled to 0° F. (about −18° C.) and manually pummeled with a 1 lb. (about 0.45 kg.) hammer on a steel plate at a 45 degree angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100% of the glass remains adhered to the interlayer. Pummel values are grouped and averaged for like specimens. Reported values state the average pummel value for the group and the maximum range of the pummel adhesion rating for individual surfaces. The interlayers of the present disclosure have a pummel adhesion rating of at least 2, greater than 2, greater than 4, greater than 6, and greater than 8.

The refractive index (RI) of the interlayers was measured in accordance with ASTM D542. The reported RI values are obtained at a wavelength of 589 nm and at 25° C.

The invention also includes the following Embodiments 1 to 36, set forth below.

Embodiment 1 is a polymer interlayer comprising: poly (vinyl butyral) resin; and at least one high refractive index plasticizer having a refractive index of at least about 1.460; wherein the interlayer comprises about 5 to about 120 parts of the high refractive index plasticizer mixture per 100 parts poly(vinyl butyral) resin.

Embodiment 2 is a polymer interlayer comprising: poly (vinyl butyral) resin; and at least one high refractive index plasticizer having a refractive index of at least about 1.460; wherein the interlayer comprises about 5 to about 120 parts of the high refractive index plasticizer mixture per 100 parts poly(vinyl butyral) resin, and wherein the refractive index of the polymer interlayer is at least 1.480.

Embodiment 3 is a multiple layer polymer interlayer comprising: poly(vinyl butyral) resin; and at least one high refractive index plasticizer having a refractive index of at least about 1.460; wherein the multiple layer polymer interlayer has at least one soft layer and at least one stiff layer, and wherein the difference between the refractive index of the soft layer and the stiff layer (Delta RI) is less than about 0.010.

Embodiment 4 is a multiple layer polymer interlayer comprising: poly(vinyl butyral) resin; and at least one high refractive index plasticizer having a refractive index of at least about 1.460; wherein the multiple layer polymer interlayer has at least one soft layer and at least two stiff layers wherein the soft layer is disposed between the stiff layers, and wherein the difference between the refractive index of the soft layer and the stiff layers is less than about 0.010.

Embodiment 5 is a multiple layer polymer interlayer comprising: a first layer comprising poly(vinyl butyral) resin and a first plasticizer; a second layer comprising poly(vinyl butyral) resin and a second plasticizer; and a third layer comprising poly(vinyl butyral) resin and a third plasticizer disposed between the first layer and the second layer; and wherein at least one of the first, second and third plasticizers is a high refractive index plasticizer having a refractive index of at least about 1.460; wherein at least one layer is a soft layer and at least one layer is a stiff layer, and wherein the difference between the refractive index of the soft layer and the stiff layer (Delta RI) is less than about 0.010.

Embodiment 6 is a multiple layer polymer interlayer comprising: a first stiff layer comprising poly(vinyl butyral) resin and a first plasticizer, wherein the first plasticizer is present in an amount of from 5 phr to 60 phr; a second stiff layer comprising poly(vinyl butyral) resin and a second plasticizer, wherein the second plasticizer is present in an amount of from 5 phr to 60 phr; and a first soft layer comprising poly(vinyl butyral) resin and a third plasticizer, wherein the third plasticizer is present in an amount of from 10 phr to 120 phr, and wherein the first soft layer is disposed between the first stiff layer and the second stiff layer; wherein at least one of the first, second and third plasticizers is a high refractive index plasticizer having a refractive index of at least about 1.460; wherein the difference between the refractive index of the soft layer and the stiff layers is less than about 0.010.

Embodiment 7 is a polymer interlayer that includes the features of any of Embodiments 1 to 6, wherein the high refractive index plasticizer has a refractive index of at least about 1.470.

Embodiment 8 is a polymer interlayer that includes the features of any of Embodiments 1 to 7, wherein the high refractive index plasticizer has a refractive index of at least about 1.480.

Embodiment 9 is a polymer interlayer that includes the features of any of Embodiments 1 to 8, wherein the high refractive index plasticizer has a refractive index of at least about 1.490.

Embodiment 10 is a polymer interlayer that includes the features of any of Embodiments 1 to 9, wherein the difference between the refractive index of the resin and the refractive index of the high refractive index plasticizer is less than about 0.075.

Embodiment 11 is a polymer interlayer that includes the features of any of Embodiments 1 to 10, wherein the difference between the refractive index of the resin and the refractive index of the high refractive index plasticizer is less than about 0.050.

Embodiment 12 is a polymer interlayer that includes any of the features of Embodiments 1 to 11, wherein the high refractive index plasticizer has a refractive index of from about 1.460 to about 1.560.

Embodiment 13 is a multiple layer polymer interlayer that includes the features of any of Embodiments 3 to 12, wherein the soft layer comprises a poly(vinyl butyral) resin having a residual hydroxyl content from 8 to 21 wt. %, and wherein the stiff layer comprises a poly(vinyl butyral) resin having a residual hydroxyl content from 16 to 35 wt. %, and wherein the residual hydroxyl content between the adjacent soft and stiff layers differs by at least 2 wt. %.

Embodiment 14 is a multiple layer polymer interlayer that includes the features of any of Embodiments 3 to 13, wherein the soft layer has a plasticizer content of from 10 phr to 120 phr, and wherein the stiff layer has a plasticizer content of from 5 phr to 60 phr.

Embodiment 15 is a polymer interlayer that includes the features of any of Embodiments 1 to 14, wherein the polymer interlayer comprises at least two different high refractive index plasticizers, wherein each high refractive index plasticizer has a refractive index of at least 1.460.

Embodiment 16 is a polymer interlayer that includes the features of any of Embodiments 1 to 14, wherein the polymer interlayer comprises at least two plasticizers, wherein at least one plasticizer has a refractive index of at least 1.460 and at least one plasticizer has a refractive index of less than about 1.450.

Embodiment 17 is a polymer interlayer that includes the features of any of Embodiments 1 to 16, wherein the high refractive plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

Embodiment 18 is a polymer interlayer that includes the features of Embodiments 1 to 17, wherein the high refractive plasticizer is selected from dipropylene glycol dibenzoate, tripropylene glycol dibenzoate, and 2,2,4-trimethyl-1,3-pentanediol dibenzoate.

Embodiment 19 is a polymer interlayer that includes the features of any of Embodiments 1 to 18, further comprising an additional plasticizer, wherein the additional plasticizer is triethylene glycol di-(2-ethylhexanoate).

Embodiment 20 is a multiple layer polymer interlayer that includes the features of any of Embodiments 3 to 19, wherein the multiple layer polymer interlayer further comprises a second stiff layer, and wherein the soft layer is disposed between the stiff layers, or a second soft layer and wherein the stiff layer is disposed between the soft layers.

Embodiment 21 is a multiple layer polymer interlayer that includes the features of Embodiment 15, wherein the at least two different high refractive plasticizers are in the same layer.

Embodiment 22 is a multiple layer polymer interlayer that includes the features of Embodiment 15, wherein the at least two different high refractive plasticizers are in different layers.

Embodiment 23 is a multiple layer polymer interlayer that includes the features of any of Embodiments 5 to 22, wherein the first and second layers comprise the plasticizer having a refractive index of at least 1.460, and wherein the third layer comprises the plasticizer having a refractive index of less than 1.450.

Embodiment 24 is a multiple layer polymer interlayer that includes the features of any of Embodiments 5 to 22, wherein the third layer comprises the plasticizer having a refractive index of at least 1.460, and wherein the first and second layers comprise the plasticizer having a refractive index of less than 1.450.

Embodiment 25 is a multiple layer polymer interlayer that includes the features of any of Embodiments 5 to 24, wherein the first and second layers are stiff layers, and wherein the third layer is a soft layer.

Embodiment 26 is a multiple layer polymer interlayer that includes the features of any of Embodiments 5 to 24, wherein the first and second layers are soft layers, and wherein the third layer is a stiff layer.

Embodiment 27 is a polymer interlayer comprising: poly(vinyl butyral) resin; and a plasticizer mixture comprising: at least one plasticizer having a refractive index of less than about 1.450; and at least one high refractive index plasticizer having a refractive index of at least 1.460; wherein the refractive index of the plasticizer mixture is at least 1.460; and wherein the interlayer comprises about 5 to about 120 parts plasticizer mixture per 100 parts poly(vinyl butyral) resin.

Embodiment 28 is a multiple layer polymer interlayer comprising: poly(vinyl butyral) resin; and a plasticizer mixture comprising: at least one plasticizer selected from the group consisting of: triethylene glycol di-(2-ethylhexanoate), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, bis(2-(2-butoxyethoxy)ethyl) adipate, dibutyl sebacate, and dioctyl sebacate; and at least one high refractive index plasticizer having a refractive index of at least 1.460; wherein the refractive index of the plasticizer mixture is at least 1.460; wherein the multiple layer polymer interlayer has at least one soft layer and at least one stiff layer, and wherein the difference between the refractive index (Delta RI) of the soft layer and the stiff layer is less than about 0.010.

Embodiment 29 is a multiple layer polymer interlayer comprising: a first layer comprising poly(vinyl butyral) resin and a first plasticizer; a second layer comprising poly(vinyl butyral) resin and a second plasticizer; and a third layer comprising poly(vinyl butyral) resin and a third plasticizer disposed between the first layer and the second layer; wherein at least one of the first, second and third plasticizers is a mixture comprising: at least one plasticizer having a refractive index of less than about 1.450; and at least one high refractive index plasticizer having a refractive index of at least 1.460; wherein the refractive index of the plasticizer mixture is at least 1.460; wherein at least one of the layers is a soft layer and at least one of the layers is a stiff layer, and wherein the difference between the refractive index (Delta RI) of the soft layer and the stiff layer is less than about 0.010.

Embodiment 30 is a polymer interlayer that includes the features of any of Embodiments 27 to 29, wherein the plasticizer mixture has a refractive index of from about 1.460 to about 1.560.

Embodiment 31 is a multiple layer polymer interlayer that includes the features of any of Embodiments 28 to 30, wherein the soft layer comprises a poly(vinyl butyral) resin having a residual hydroxyl content from 8 to 21 wt. %, and wherein the stiff layer comprises a poly(vinyl butyral) resin having a residual hydroxyl content from 16 to 35 wt. %, and wherein the residual hydroxyl content between the adjacent soft and stiff layers differs by at least 2 wt. %.

Embodiment 32 is a multiple layer polymer interlayer that includes the features of any of Embodiments 28 to 31, wherein the soft layer has a plasticizer content of from 10 phr to 120 phr, and wherein the stiff layer has a plasticizer content of from 5 phr to 60 phr.

Embodiment 33 is a polymer interlayer that includes the features of any of Embodiments 27 to 32, wherein the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

Embodiment 34 is a multiple layer polymer interlayer that includes the features of any of Embodiments 28 to 33, wherein the multiple layer polymer interlayer further comprises a second stiff layer, and wherein the soft layer is disposed between the stiff layers or a second soft layer and wherein the stiff layer is disposed between the soft layers.

Embodiment 35 is a multiple layer panel comprising any of the polymer interlayers of Embodiments 1 to 34.

Embodiment 36 is a method of making the polymer interlayer of any of Embodiments 1 to 34.

EXAMPLES

The improvements (or reduction) in the level of mottle and haze in a multilayer interlayer when using a high refractive index plasticizer(s) or mix of plasticizers can be most readily appreciated by a comparison of multilayer (trilayer) interlayers having a plasticizer that is a high refractive index plasticizer(s) or a combination of a high refractive index plasticizer(s) and a conventional plasticizer (designated as "Disclosed Interlayers") to a multilayer interlayer having only a conventional plasticizer, such as triethylene glycol di-(2-ethylhexonate) ("3GEH") (designated as "Conventional Interlayers"). The Conventional Interlayers are shown as C1 to C7 in Table 1, and the Disclosed Interlayers are shown in Table 2 to Table 6 below). These Examples demonstrate the difference in refractive index (Delta RI) between the layers can be minimized and the optical quality (mottle and haze or clarity) improved when a high refractive index plasticizer(s) is used either alone or in combination with one or more plasticizers.

The Disclosed and Conventional Interlayers were produced by mixing and melt-extruding mixtures of 100 parts poly(vinyl butyral) resin and plasticizer, and other common additives. The types and amounts of plasticizers used are shown in the Tables below. Plasticizers are labeled as A, B, C, D, E or F, where C is the Conventional Plasticizer, 3GEH, and A, B, D, E and F are each high refractive index plasticizers or mixtures of plasticizers as shown below and in the Tables. The poly(vinyl butyral) resin used in the stiff (skin) layer had about 18 to 19 wt. % residual hydroxyl content and a vinyl acetate residue of 2%, and the poly(vinyl butyral) resin used in the soft (core) layer had about 10 to 11 wt. % residual hydroxyl content and a vinyl acetate residue of 2%. The amounts of plasticizer, the refractive indices, and the Delta RI results are as shown below in Table 1 to Table 6.

Plasticizers Used:
Plasticizer A: Dioctyl Terephthalate (RI—1.487)
Plasticizer B: Mixture of 30% 3GEH and 70% Benzoflex 2088*(wt./wt.)
(RI of the mixture—1.510, Benzoflex 2088 RI—1.539)
Plasticizer C: 3GEH (RI—1.442) (Conventional Plasticizer)
Plasticizer D: Nonylphenol Tetra-ethylene Glycol (RI—1.497)
Plasticizer E: Mixture of 50% 3GEH and 50% Benzoflex 2088*(wt./wt.)
(RI of the mixture—1.491, Benzoflex 2088 RI—1.539)
Plasticizer F: Mixture of 25% 3GEH and 75% Benzoflex 9-88**(wt./wt.)
(RI of the mixture—1.507, Benzoflex 9-88 RI—1.528)

TABLE 1

Conventional Interlayers
Plasticizer C: 3GEH (RI-1.442) (Conventional Plasticizer)

| Sample | Skin Plasticizer (phr) | Skin RI | Core Plasticizer (phr) | Core RI | Delta RI |
|---|---|---|---|---|---|
| C1 | 40 | 1.476 | 40 | 1.473 | 0.003 |
| C2 | 40 | 1.476 | 50 | 1.471 | 0.005 |
| C3 | 40 | 1.476 | 60 | 1.469 | 0.007 |
| C4 | 40 | 1.476 | 70 | 1.467 | 0.009 |
| C5 | 40 | 1.476 | 80 | 1.466 | 0.010 |
| C6 | 40 | 1.476 | 90 | 1.465 | 0.011 |
| C7 | 40 | 1.476 | 100 | 1.464 | 0.012 |

TABLE 2

Plasticizer A: Dioctyl Terephthalate (RI-1.487)

| Sample | Skin Plasticizer (phr) | Skin RI | Core Plasticizer (phr) | Core RI | Delta RI |
|---|---|---|---|---|---|
| A1 | 40 | 1.489 | 40 | 1.486 | 0.003 |
| A2 | 40 | 1.489 | 50 | 1.486 | 0.003 |
| A3 | 40 | 1.489 | 60 | 1.486 | 0.003 |
| A4 | 40 | 1.489 | 70 | 1.486 | 0.003 |
| A5 | 40 | 1.489 | 80 | 1.486 | 0.003 |
| A6 | 40 | 1.489 | 90 | 1.486 | 0.003 |
| A7 | 40 | 1.489 | 100 | 1.486 | 0.003 |

TABLE 3

Plasticizer B: Mixture of 30% 3GEH and 70% Benzoflex 2088* (wt./wt.)
(RI of the mixture-1.510, Benzoflex 2088 RI-1.539)

| Sample | Skin Plasticizer (phr) | Skin RI | Core Plasticizer (phr) | Core RI | Delta RI |
|---|---|---|---|---|---|
| B1 | 40 | 1.496 | 40 | 1.492 | 0.004 |
| B2 | 40 | 1.496 | 50 | 1.493 | 0.003 |
| B3 | 40 | 1.496 | 60 | 1.494 | 0.002 |
| B4 | 40 | 1.496 | 70 | 1.495 | 0.001 |
| B5 | 40 | 1.496 | 80 | 1.496 | 0.000 |
| B6 | 40 | 1.496 | 90 | 1.497 | 0.001 |
| B7 | 40 | 1.496 | 100 | 1.498 | 0.002 |

*Benzoflex 2088 is plasticizer that is a mixture of benzoates

TABLE 4

Plasticizer D: Nonylphenol Tetra-ethylene Glycol (RI-1.497)

| Sample | Skin Plasticizer (phr) | Skin RI | Core Plasticizer (phr) | Core RI | Delta RI |
|---|---|---|---|---|---|
| D1 | 40 | 1.492 | 40 | 1.488 | 0.004 |
| D2 | 40 | 1.492 | 50 | 1.489 | 0.003 |
| D3 | 40 | 1.492 | 60 | 1.490 | 0.002 |
| D4 | 40 | 1.492 | 70 | 1.490 | 0.002 |
| D5 | 40 | 1.492 | 80 | 1.490 | 0.003 |
| D6 | 40 | 1.492 | 90 | 1.491 | 0.001 |
| D7 | 40 | 1.492 | 100 | 1.491 | 0.001 |

TABLE 5

Plasticizer E: Mixture of 50% 3GEH and 50% Benzoflex 2088* (wt./wt.)
(RI of the mixture-1.491, Benzoflex 2088 RI-1.539)

| Sample | Skin Plasticizer (phr) | Skin RI | Core Plasticizer (phr) | Core RI | Delta RI |
|---|---|---|---|---|---|
| E1 | 40 | 1.490 | 40 | 1.487 | 0.003 |
| E2 | 40 | 1.490 | 50 | 1.487 | 0.003 |
| E3 | 40 | 1.490 | 60 | 1.487 | 0.003 |
| E4 | 40 | 1.490 | 70 | 1.487 | 0.003 |
| E5 | 40 | 1.490 | 80 | 1.488 | 0.002 |
| E6 | 40 | 1.490 | 90 | 1.488 | 0.002 |
| E7 | 40 | 1.490 | 100 | 1.488 | 0.002 |

*Benzoflex 2088 is plasticizer that is a mixture of benzoates

TABLE 6

Plasticizer F: Mixture of 25% 3GEH and 75% Benzoflex 9-88** (wt./wt.)
(RI of the mixture-1.507, Benzoflex 9-88 RI-1.528)

| Sample | Skin Plasticizer (phr) | Skin RI | Core Plasticizer (phr) | Core RI | Delta RI |
|---|---|---|---|---|---|
| F1 | 40 | 1.495 | 40 | 1.491 | 0.004 |
| F2 | 40 | 1.495 | 50 | 1.492 | 0.003 |
| F3 | 40 | 1.495 | 60 | 1.493 | 0.002 |
| F4 | 40 | 1.495 | 70 | 1.494 | 0.001 |
| F5 | 40 | 1.495 | 80 | 1.495 | 0.000 |
| F6 | 40 | 1.495 | 90 | 1.485 | 0.000 |
| F7 | 40 | 1.495 | 100 | 1.496 | 0.001 |

**Benzoflex 9-88 is a dipropylene glycol dibenzoate plasticizer

Tables 1 to 6 show that for the Conventional Interlayers, which include conventional plasticizer (such as 3GEH) having a refractive index of less than about 1.450, as the level of plasticizer in the soft (core) layer is increased from 40 phr to 100 phr, the Delta RI between the soft (core) and the stiff (skin) layers increases significantly from 0.003 at 40 phr to 0.012 at 100 phr, as shown in Table 1. This fourfold increase in the Delta RI between the soft (core) and the stiff (skin) layers will translate to an increased level of mottle or a higher mottle rating, as well as higher haze, in the multilayer glazing panel, as further discussed below.

Where a high refractive index plasticizer or mix of plasticizers including at least one high refractive index plasticizer is used, such that the refractive index is greater than about 1.460 (and higher than the RI of the conventional plasticizer), the Delta RI between the soft (core) and the stiff (skin) layers did not increase significantly as the level of plasticizer in the soft (core) layer increased, as shown in Tables 2 to 6. With some plasticizers, the Delta RI did not change, while in others, the change was from 0.001 to 0.004.

In some cases, the Delta RI stayed essentially the same or was even reduced. As shown in Table 2, when Plasticizer A (RI of 1.487) was used, the Delta RI was the same regardless (0.003) of the amount of plasticizer in the soft (core) layer. As shown in Table 3, when Plasticizer B (a mixture of a conventional plasticizer and a high refractive index plasticizer, wherein the mixture had an RI of about 1.510) was used, the Delta RI varied slightly, from 0.004 at 40 phr Plasticizer B in the soft (core) layer, to zero at 80 phr in the soft (core) layer, to 0.002 at 100 phr in the soft (core) layer. Using Plasticizer D (RI of 1.497), as shown in Table 4, had similar results to those in Table 3, where the Delta RI varied slightly from 0.004 to 0.001 depending on the level of Plasticizer D in the soft (core) layer. Using a mixture having a different ratio of conventional plasticizer to high refractive index plasticizer (Plasticizer E) produced a more consistent, but still very low, Delta RI, as shown in Table 5, where the Delta RI was 0.003 at plasticizer levels of 40 to 70 phr in the soft (core) layer, and 0.002 at plasticizer levels of 80 to 100 phr in the soft (core) layer. Finally, using a different mixture of plasticizers (Plasticizer F) produced similar variation in Delta RI as that in Table 3. Regardless of which high refractive index plasticizer or mix of plasticizers having at least one high refractive index plasticizer was used, the Delta RI was consistently lower and less variable than when a conventional plasticizer (Plasticizer C) was used.

The multilayer interlayers listed in Table 7 were produced by mixing and melt co-extruding the mixtures of 100 parts poly(vinyl butyral) resin with a plasticizer or plasticizer mix (A, B, C, E or F as previously described above), and other common additives. The poly(vinyl butyral) resin used in the stiff (skin) layer had about 18 to 19 wt. % residual hydroxyl content and a vinyl acetate residue of 2%, and the poly(vinyl butyral) resin used in the soft (core) layer had about 10 to 11 wt. % residual hydroxyl content and a vinyl acetate residue of 2%. All of the multiple layer interlayers in Table 7 were produced by co-extruding the mixtures of resin and plasticizer for the stiff (skin) and soft (core) layer layers to form multilayer interlayer sheets at standard conditions. The surface roughness, Rz, for all the interlayers in Table 7 was about 42 to 45 microns. The type and amount of plasticizer used and the respective refractive indices of the layers are shown in Table 7. Additionally, the level of mottle of the multiple layer interlayer sheet in a laminated multiple layer glass panel was measured and is shown in Table 7 below. One Conventional and one exemplary Disclosed Interlayer (samples G1 and G5 respectively) were also tested for Haze and Pummel Adhesion levels, to demonstrate that other performance properties and characteristics of the interlayer were not adversely affected by the inclusion of a high refractive index plasticizer (or mix of plasticizers comprising at least one high refractive index plasticizer and having a high refractive index for the mixture).

TABLE 7

| Sample | Plasticizer | Skin Plasticizer (phr) | Skin RI | Core Plasticizer (phr) | Core RI | Delta RI | Mottle | % Haze | Pummel Adhesion |
|---|---|---|---|---|---|---|---|---|---|
| G1 | C | 38 | 1.477 | 75 | 1.467 | 0.010 | >4 | 0.2 | 3 |
| G2 | E | 40 | 1.490 | 80 | 1.488 | 0.002 | 0 | NT | NT |
| G3 | B | 40 | 1.496 | 84 | 1.496 | 0.000 | 0 | NT | NT |
| G4 | A | 38 | 1.489 | 75 | 1.486 | 0.003 | <1 | NT | NT |
| G5 | F | 42 | 1.495 | 84 | 1.495 | 0.000 | 0 | 0.2 | 3 |

NT—Not Tested

Table 7 shows that for the Disclosed Interlayer samples (which included a high refractive index plasticizer or mixture of plasticizers comprising at least one high refractive index and having a high refractive index for the mixture), the difference between the refractive indices of the skin and core layers for the samples with the high refractive index plasticizer(s) is lower (that is, less than 0.010, or even less than 0.004, or 0.003 or less) than the difference between the refractive indices of the stiff (skin) and soft (core) layers of the interlayers with the Conventional Plasticizer. Additionally, as shown in Table 7, the mottle of the Disclosed Interlayers was less than 1, or even rated as 0, which is significantly lower than the mottle in the Conventional Interlayer, which was greater than 4, thus producing an interlayer sheet with improved optical quality and very low mottle.

Haze and Pummel Adhesion levels were tested on one Conventional Interlayer and one Disclosed Interlayer (Samples G1 and G5 respectively), and there was no difference between them, showing that there is no adverse effect due to the use of a high refractive index plasticizer.

In conclusion, the interlayers comprising high refractive index plasticizer(s) as described herein have advantages over interlayers using conventional plasticizer having a lower refractive index as previously utilized in the art. In general, use of a high refractive index plasticizer either alone or in combination with a conventional plasticizer and/or a second high refractive index plasticizer results in significantly decreased levels of mottle and good clarity (i.e., low haze) therefore improved optical quality interlayers. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A multiple layer polymer interlayer comprising:
a first polymer layer comprising a poly(vinyl butyral) resin having a residual hydroxyl content from 8 to 21 wt. % and a first plasticizer; and
a second polymer layer adjacent the first polymer layer, the second polymer layer comprising a poly(vinyl butyral) resin having a residual hydroxyl content from 16 to 35 wt. % and a second plasticizer;
wherein at least one of the first plasticizer and the second plasticizer is a high refractive index plasticizer having a refractive index of at least about 1.460;
and wherein the residual hydroxyl content between the adjacent first and second layers differs by at least 2 wt %.

2. The multiple layer polymer interlayer of claim 1, wherein the high refractive index plasticizer has a refractive index of from about 1.460 to about 1.560.

3. The multiple layer polymer interlayer of claim 1, wherein the difference between the refractive index of the first layer and the second layer (Delta RI) is less than about 0.010.

4. The multiple layer polymer interlayer of claim 1, wherein the first layer has a plasticizer content of from 10 phr to 120 phr, and wherein the second layer has a plasticizer content of from 5 phr to 60 phr.

5. The multiple layer polymer interlayer of claim 1, wherein the polymer interlayer comprises at least two different high refractive index plasticizers, wherein each high refractive index plasticizer has a refractive index of at least 1.460.

6. The multiple layer polymer interlayer of claim 1, wherein the polymer interlayer comprises at least two different plasticizers, wherein at least one plasticizer has a refractive index of at least 1.460 and wherein at least one plasticizer has a refractive index of less than about 1.450.

7. The multiple layer polymer interlayer of claim 1, wherein the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

8. The multiple layer polymer interlayer of claim 7, wherein the high refractive index plasticizer is selected from dipropylene glycol dibenzoate, tripropylene glycol dibenzoate, and 2,2,4-trimethyl-1,3-pentanediol dibenzoate.

9. The multiple layer polymer interlayer of claim 7, further comprising an additional plasticizer, wherein the additional plasticizer is triethylene glycol di-(2-ethylhexanoate).

10. The multiple layer polymer interlayer of claim 1, wherein the multiple layer polymer interlayer further comprises a third polymer layer, and wherein the first layer is disposed between the second layer and the third layer.

11. A multiple layer polymer interlayer comprising:
a first polymer layer comprising:
poly(vinyl butyral) resin; and
a plasticizer mixture comprising:
at least one plasticizer selected from the group consisting of: triethylene glycol di-(2-ethylhexanoate), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, di(butoxyethyl) adipate, bis(2-(2-butoxyethoxy)ethyl) adipate, dibutyl sebacate, and dioctyl sebacate; and
at least one high refractive index plasticizer having a refractive index of at least 1.460;
a second polymer layer comprising a poly(vinyl butyral resin and a plasticizer;
wherein the difference between the refractive index (Delta RI) of the first layer and the second layer is less than about 0.010.

12. The multiple layer polymer interlayer of claim 11, wherein the plasticizer mixture has a refractive index of from about 1.460 to about 1.560.

13. The multiple layer polymer interlayer of claim 11, wherein the first layer comprises a poly(vinyl butyral) resin having a residual hydroxyl content from 8 to 21 wt. %, and wherein the second layer comprises a poly(vinyl butyral) resin having a residual hydroxyl content from 16 to 35 wt. %, and wherein the residual hydroxyl content between the adjacent first and second layers differs by at least 2 wt. %.

14. The multiple layer polymer interlayer of claim 11, wherein the first layer has a plasticizer content of from 10 phr to 120 phr, and wherein the second layer has a plasticizer content of from 5 phr to 60 phr.

15. The multiple layer polymer interlayer of claim 11, wherein the high refractive index plasticizer is selected from dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof.

16. The multiple layer polymer interlayer of claim 11, wherein the multiple layer polymer interlayer further comprises a third polymer layer, and wherein the first layer is disposed between the second layer and the third layer.

17. A multiple layer polymer interlayer comprising:
a first polymer layer comprising poly(vinyl butyral) resin and at least one high refractive index plasticizer having a refractive index of at least about 1.460;
a second polymer layer comprising poly(vinyl butyral) resin and at least one plasticizer having a refractive index of less than 1.460;
a third polymer layer comprising poly(vinyl butyral) resin and at least one plasticizer having a refractive index of less than 1.460; wherein the first layer is between and adjacent to the second and third layers;
wherein the difference between the refractive index of the first layer and at least one of the second and third layers is less than about 0.010.

18. The multiple layer polymer interlayer of claim 17, wherein the first layer comprises a poly(vinyl butyral) resin having a residual hydroxyl content from 8 to 21 wt. %, and wherein the second and third layer each comprise a poly(vinyl butyral) resin having a residual hydroxyl content from 16 to 35 wt. %, and wherein the residual hydroxyl content between the adjacent layers differs by at least 2 wt. %.

19. The multiple layer polymer interlayer of claim 17, wherein the first layer has a plasticizer content of from 10 phr to 120 phr, and wherein each of the second and third layers has a plasticizer content of from 5 phr to 60 phr.

20. The multiple layer polymer interlayer of claim 17, wherein at least one of the second and third layers further comprises a high refractive index plasticizer having a refractive index of at least 1.460.

* * * * *